Nov. 3, 1936.  H. A. HOKE  2,059,352
SPRING CLIP
Filed Aug. 7, 1935
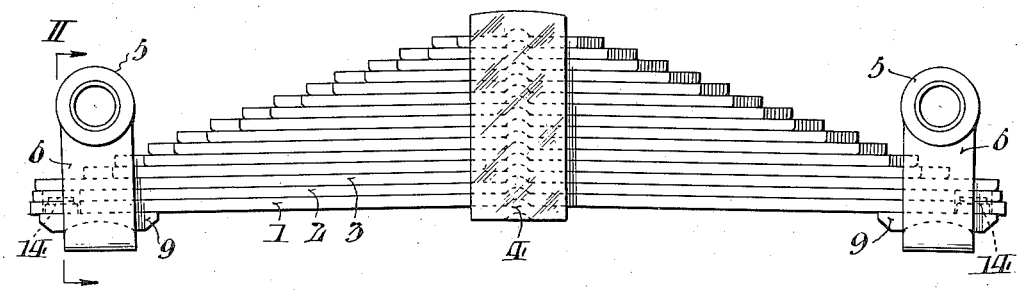
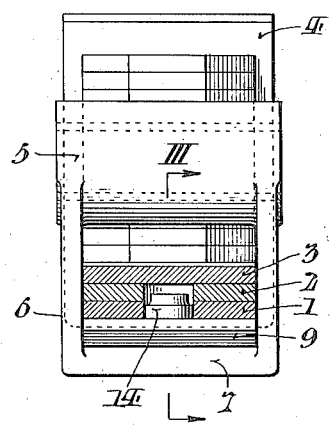
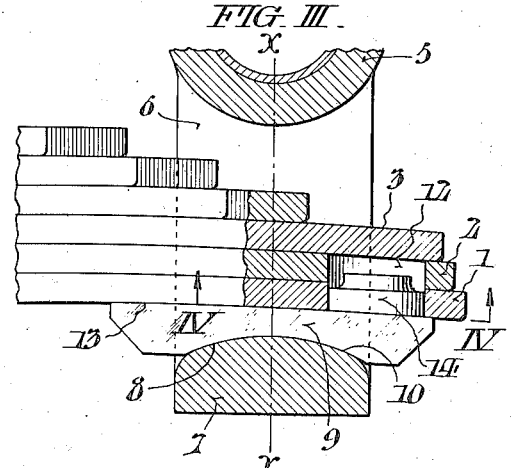
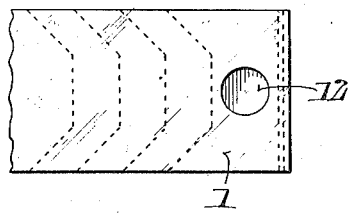
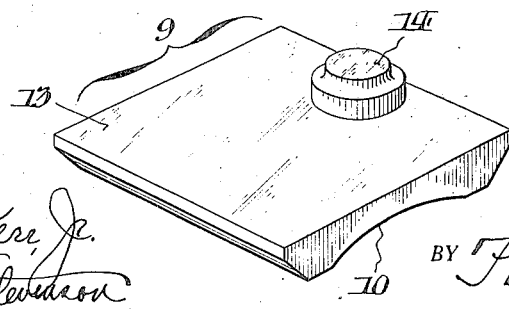
INVENTOR:
Harry A. Hoke,
BY
ATTORNEYS.

Patented Nov. 3, 1936

2,059,352

UNITED STATES PATENT OFFICE 2,059,352

SPRING CLIP

Harry A. Hoke, Altoona, Pa.

Application August 7, 1935, Serial No. 35,048

2 Claims. (Cl. 267—54)

This invention relates to hanger clips for semi-elliptical springs, and while capable of a variety of applications, is particularly useful when applied to the semi-elliptical springs of locomotive trucks.

Considerable difficulty has heretofore been experienced with semi-elliptical springs for locomotives or the like, due to failures of the main or long leaves of the spring occurring at or near the points where the spring hangers apply their load. Such difficulty is generally due to the method of attaching the hanger clip or seat to the spring leaves. According to one of the methods heretofore proposed, clips for engagement with the hangers have been welded to the ends of the bottom leaf of the spring. Such a welding process frequently damages the spring steel with the result that failures are likely to occur at points between the body of the spring leaf and the end portions thereof to which the clips are welded. Another method of attaching hanger clips to semi-elliptical springs involves the provision of holes penetrating the ends of two or more of the long spring leaves, and the use of projecting members on the clips fitting the holes and preventing relative movement between the clips and the leaves. Holes of this character have customarily been formed by punching, and are located directly in line with or inside the points through which the load from the spring hanger is communicated to the spring. This materially weakens the leaves with the result that failures often occur therein in the vicinity of the holes. In still other cases it has been proposed to employ elongated slots passing through all of the long leaves of the spring assembly and disposed directly in line with the load application, the slots accommodating spring hangers which project therethrough. With this construction, failures also occur in the spring leaves, partly as a result of the maltreatment they receive in the process of manufacture incident to the slotting operation.

The object of the present invention is to overcome failures of the type indicated, and for this purpose a hanger clip is provided which is connected to the long leaves of a semi-elliptical spring by holes which are drilled outside of the hanger centers, and hence outside of the points of load application, so that there is no danger of overstressing the leaves at the holes. The invention is further characterized by the use of specially formed clips which are held in place by lugs or projections fitting the holes aforesaid. I have found that such a construction will avoid all of the difficulties heretofore experienced, and that it produces a far more satisfactory method of applying the load to semi-elliptical springs than any of the prior methods of which I am aware.

Other more specific objects and advantages characterizing my invention will become more fully apparent from the description hereinafter set forth of one example or embodiment of the invention, having reference to the accompanying drawing, whereof:

Fig. I represents a side elevation of a semi-elliptical spring illustrating my improvement.

Fig. II represents an enlarged cross section, taken at one end of the spring as indicated by the line II—II of Fig. I.

Fig. III represents an enlarged side view of one end of the spring, with a portion thereof shown in longitudinal cross section, taken as indicated by the line III—III of Fig. II.

Fig. IV represents a bottom view of one end of the spring, with the hanger and clip removed; and Fig. V represents a perspective view of one of the spring clips employed.

In the drawing, the main or long leaves at the bottom of the assembly of superimposed leaves comprising the spring are indicated with the reference numeral 1 applied to the bottommost leaf, the reference numeral 2 applied to the second leaf, and the reference numeral 3 applied to the third leaf from the bottom. All of the leaves of the group are banded together by the usual center strap 4. The load is applied by means of hangers 5 disposed at each end of the spring, and of conventional form. Each hanger 5 includes a stirrup portion 6 which surrounds the ends of the lower spring leaves of the group, and which includes a bearing member 7 having a rounded top surface 8 indicated most clearly in Fig. III.

At each end of the spring there is provided a clip 9, the particular form of which is clearly shown in the perspective view of Fig. V, which serves to transmit the load from the bearing member 7 of each hanger 5 to the lower leaves 1, 2, 3, of the spring group. Each clip 9 is formed with a concave bottom surface 10 having rocking engagement with the convex top surface 8 of the bearing member 7 of the spring hanger 5. The central axis of the hanger 5 is designated by the dot-and-dash lines $x$—$x$ of Fig. III, and coincides with the mean line of action of the forces applied at the end of the spring when it is placed under load. The main leaves 1, 2 of the spring group are drilled with round holes 12 in registry with each other and disposed substantially outside the line of load application $x$—$x$. Each spring clip 9 has a substantially flat top surface 13 engaging the underside of the bottommost leaf 1, and projecting upwardly therefrom there is a cylindrical lug 14 which is adapted to be received within the holes 12 of the spring leaves 1, 2. The clip 9 is desirably of the same width as that of the spring leaves, and together with the lower leaves of the spring is surrounded by the stirrup portion 6 of the spring hanger 5, as clearly shown in Fig. II. The holes 12 of the spring leaves 1, 2 are desirably drilled rather than punched, so as to minimize the weakening of the metal of the leaves in the process of manufacture. As the holes 12 are round in shape, the drilling can obviously be done very cheaply.

It will be particularly observed that the end portions of all of the leaves of the spring assembly are solid, i. e., imperforate, throughout the regions inside the points of load application, the only perforations in the leaves being located in the regions outside such points of load application. It results from this construction that there is no reduction in the strength of any of the individual leaves of the spring inside of the hanger bearings, and failures, even under extreme conditions of service, are thus prevented.

Moreover, it will be apparent that my invention, although it involves a substantial improvement in prolonging the life of semi-elliptical springs, is nevertheless accomplished by the use of comparatively simple means, without requiring radical changes in standard practice as to the construction of semi-elliptical springs, and without increased cost.

While I have described my invention with reference to one specific example of the same, as applied to a semi-elliptical spring for a locomotive truck, it will be apparent that the invention has a wide application, and that the form of the apparatus herein described and illustrated may be varied to considerable extent without departing from the spirit of the invention as defined in the annexed claims.

Having thus described my invention, I claim:

1. In combination, a semi-elliptical spring comprising an assembly of superimposed leaves, hangers at the ends of said leaf assembly having bearing members through which the load is applied, clips interposed between said bearings and said leaves, said clips having capacity for rocking engagement with said bearing members and being adapted to maintain full surface contact with said leaves under varying conditions of spring deflection, each said clip having a vertical projection freely seating in a hole drilled in said leaf assembly and disposed outside the points of load application on said clips, said clips being unattached to the leaf assembly, and the end portions of said leaves being solid throughout the regions inside said points of load application.

2. In combination, a semi-elliptical spring comprising an assembly of superimposed leaves and hanger clips at the ends of said leaf assembly, said clips having capacity for rocking engagement with said hanger clips and being adapted to maintain full surface contact with said leaves under varying conditions of spring deflection, each said clip having a non-shifting connection with said leaf assembly comprising a vertically projecting lug seating freely in a hole drilled in said leaf assembly and disposed outside the points of load application, and the end portions of said leaves being unattached to said hanger clips and being solid throughout the regions inside said points of load application.

HARRY A. HOKE.